United States Patent
Mukaibara

[11] Patent Number: 5,953,218
[45] Date of Patent: Sep. 14, 1999

[54] HIGH VOLTAGE GENERATION APPARATUS

[75] Inventor: Takuya Mukaibara, Numazu, Japan

[73] Assignee: Canon Kabushiki Kaisha, Tokyo, Japan

[21] Appl. No.: 09/098,330

[22] Filed: Jun. 17, 1998

[30] Foreign Application Priority Data

Jun. 19, 1997 [JP] Japan ................................. 9-177849
Jun. 15, 1998 [JP] Japan ................................ 10-166898

[51] Int. Cl.⁶ .......................................... H02M 3/335
[52] U.S. Cl. ................................ 363/21; 363/79; 363/98
[58] Field of Search ................................ 363/16, 17, 20, 363/21, 78, 79, 95, 97, 98, 131, 132

[56] References Cited

U.S. PATENT DOCUMENTS

| | | | |
|---|---|---|---|
| 4,330,816 | 5/1982 | Imazeki et al. | 363/56 |
| 4,336,585 | 6/1982 | Moriarty et al. | 363/79 |
| 4,446,560 | 5/1984 | Gabor | 373/25 |
| 5,519,306 | 5/1996 | Itoh et al. | 323/222 |
| 5,544,032 | 8/1996 | Mimura | 363/16 |
| 5,663,627 | 9/1997 | Ogawa | 318/803 |
| 5,682,305 | 10/1997 | Kurokami et al. | 363/79 |
| 5,684,685 | 11/1997 | Komatsu et al. | 363/95 |
| 5,869,956 | 2/1999 | Nagao et al. | 323/299 |
| 5,892,354 | 4/1999 | Nagao et al. | 323/299 |

*Primary Examiner*—Adolf Deneke Berhane
*Attorney, Agent, or Firm*—Fitzpatrick, Cella, Harper & Scinto

[57] ABSTRACT

A step-up transformer is switching controlled to cause it to generate a high voltage, the generated high voltage is rectified and smoothed to generate a DC output voltage, and the generated DC output voltage is supplied to a load. The generated DC output voltage is converted into a low voltage to detect a voltage value, and further a load current is detected. By such structure, a voltage detection circuit is not directly connected to a ground potential but is connected to a current detection circuit. Thus, even if a state of the load of an image formation apparatus varies due to an environmental condition and the like, an optimum current can be supplied to the load.

13 Claims, 9 Drawing Sheets

HIGH VOLTAGE GENERATION APPARATUS

BACKGROUND OF THE INVENTION

1. Field of the Invention

The present invention relates to a high voltage generation apparatus which is used for an image formation apparatus.

2. Related Background Art

A high-voltage power supply circuit has been installed in an image formation apparatus which applies an electrophotographic system, and is indispensable to an image formation process on a paper or the like. As the high-voltage power supply circuits, there are various modularized power supplies, e.g., a charge high-voltage power supply, a development high-voltage power supply, a transfer high-voltage power supply, a fixing high-voltage power supply and the like. Each of such high-voltage modules has a different specification according to the various structure of the image formation apparatus, e.g., the structure in which an AC power supply is superimposed on a DC power supply, the structure in which a DC plus power supply is superimposed on a DC minus power supply, or the like. Also, there are various specifications on a specified voltage and a specified current, a constant current control system and a constant voltage control system, a single-value output and a multistage-value control output, a load condition, and the like. In such cases, it is indispensable to use a constant voltage control circuit and a constant current control circuit such that constant voltage and current can be outputted in various conditions.

Ordinarily, a voltage detection circuit is installed in the constant voltage control circuit, and a current detection circuit is installed in the constant current control circuit. However, it can be considered a case where both the voltage detection circuit and the current detection circuit are installed in the constant voltage control circuit, and thus a constant voltage control operation is performed as a current value is monitored. Also, it can be considered a case where both the constant voltage control circuit and the constant current control circuit or both the voltage detection circuit and the current detection circuit are provided to perform a constant current control operation, a voltage value in the operation is monitored, and a calculation process is performed by using the monitored voltage value to perform the constant voltage control operation. The reason why such the cases (or methods) have been considered is to solve following problems. That is, in a case where a bias is applied only based on the constant voltage control operation, a resistance value of a transfer roller or the like is highly changed due to environment, especially humidity. Thus, since a transfer current is also changed, defective transfer comes to frequently occur. Further, in a case where the bias is applied only based on the constant current control operation, if the size (width) of a transfer member which passes over the transfer roller is small, both an area in which the transfer member exists on the transfer roller and an area in which the transfer member does not exist on the transfer roller are managed as output loads for the transfer bias. Since impedance of the area in which the transfer member does not exist on the roller is lower than that of the area in which the transfer member exists, the current flows in the area in which the transfer member does not exist. Thus, since the current does not sufficiently flow in the area in which the transfer member exists on the roller, the defective transfer comes to frequently occur at such the area.

FIG. 5 is a block circuit diagram showing the schematic structure of a high voltage generation circuit applying a conventional constant voltage control system (conventional example 1).

In FIG. 5, a high voltage control circuit is composed of a step-up transformer 101, a switching unit 102, a high-voltage rectifier diode 103, a high-voltage capacitor 104, a constant voltage control unit 105, a voltage detection unit 106 and a resistor 107.

In this structure, the switching unit 102 performs switching driving on the step-up transformer 101 in a predetermined frequency and a predetermined duty ratio. The step-up transformer 101 driven in a predetermined input voltage by the switching unit 102 boosts the input voltage to generate a high voltage of a predetermined pulsating waveform. Then, when the pulsating-waveform high voltage generated by the step-up transformer 101 is rectified and smoothed respectively by the high-voltage rectifier diode 103 and the high-voltage capacitor 104, a DC high voltage is generated and supplied to a load 110. The output voltage of the load 110 is always monitored by the voltage detection unit 106.

The voltage detection unit 106 contains therein a high-resistance bleeder resistor 107 for discharging an electric charge refreshed (or charged) in the high-voltage capacitor 104 by the step-up transformer 101 and the high-voltage rectifier diode 103. Namely, the unit 106 is structured to convert the high-voltage output voltage into a low-voltage detection signal level. The constant voltage control unit 105 always monitors a detection signal at the voltage detection unit 106, and controls the switching unit 102 such that the high-voltage output voltage generated from the step-up transformer 101 has a desired value. By structuring as above, according to the conventional example 1 shown in FIG. 5, a high-voltage power supply of the constant voltage control system capable of outputting the desired output voltage under various conditions can be obtained.

FIG. 6 is a block circuit diagram showing the schematic structure of an another high voltage generation circuit applying a conventional constant current control system (conventional example 2).

In FIG. 6, a high voltage control circuit is composed of a step-up transformer 111, a switching unit 112, a high-voltage rectifier diode 113, a high-voltage capacitor 114, a bleeder resistor 117, a constant current control unit 118 and a current detection unit 119.

In the above structure, the step-up transformer 111, the switching unit 112, the high-voltage rectifier diode 113, the high-voltage capacitor 114 and the bleeder resistor 117 have the same functions as those of the corresponding elements in the high voltage generation circuit shown as the conventional example 1. A DC current flowing in a load 120 formed at an output unit forms a current loop such as a route A shown, and such the load current is detected by the current detection unit 119.

The constant current control unit 118 always monitors a load current value detected by the current detection unit 119, and controls the switching unit 112 such that the current flowed from the high-voltage output unit in the load 120 has a desired value.

By structuring as above, according to the conventional example 2 shown in FIG. 6, a high-voltage power supply of the constant current control system capable of outputting the desired output current under various conditions can be obtained.

Further, as the high voltage generation circuits in the conventional examples 1 and 2, there are various circuits which are structured to be able to output a multistage control voltage and a multistage control current by variably changing the constant voltage control value and the constant current control value respectively used in the constant voltage control unit 105 and the constant current control unit 118.

However, in recent years, in the above-described high voltage generation circuit of the constant voltage control system or the high voltage generation circuit of the constant current control system, the high voltage generation circuit of the constant voltage control system capable of monitoring the output current value, and the high voltage generation circuit of both the constant current control system and the constant voltage control system capable of monitoring the output voltage value have become necessary.

FIG. 7 is a block circuit diagram showing the schematic structure of a conventional high voltage generation circuit applying both the constant current control system and the constant voltage control system.

In FIG. 7, a high voltage control circuit is mainly composed of a step-up transformer 121, a switching unit 122, a high-voltage rectifier diode 123, a high-voltage capacitor 124, a constant voltage control unit 125, a bleeder resistor 127, a current detection unit 129, a voltage detection unit 126 and a controller 128. In the above structure, the step-up transformer 121, the switching unit 122, the high-voltage rectifier diode 123, the high-voltage capacitor 124, the bleeder resistor 127 and the current detection unit 129 have the same functions as those of the corresponding elements in the high voltage generation circuit shown in FIG. 5 or 6.

The voltage detection unit 126 is composed of a rectifier diode 126a, a capacitor 126b and a resistor 126c. The step-up transformer 121 contains three windings 121a, 121b and 121c. In these windings, the winding 121c is used as a voltage detection winding. Since these windings are magnetically coupled together, a voltage generated at the end of the winding 121b has a voltage value tracking a voltage value at the end of the winding 121c. On the contrary, the voltage generated at the end of the winding 121c has the voltage value tracking the voltage value at the end of the winding 121b. Therefore, when a DC voltage obtained by rectifying and smoothing the output voltage at the end of the winding 121c is monitored by the constant voltage control unit 125 and subjected to constant voltage controlling, also an output voltage at the end of the winding 121b after the rectifying and smoothing can be controlled to be the desired voltage value. A DC current flowing in a load 130 connected to an output unit forms a current loop such as a route B shown, and the current detection unit 129 detects such the load current. The controller 128 always monitors the load current value detected by the current detection unit 129, and properly varies a setting voltage of the constant voltage control unit 125 such that the desired DC current flows in the load 130. By structuring as above, according to a conventional example 3 shown in FIG. 7, a constant-voltage power supply capable of causing the appropriate load current to flow in the load 130 which varies according to environment and the like can be provided.

A high voltage generation circuit which has a means for monitoring the above output voltage value and applies both the constant current control system and the constant voltage control system is illustrated in FIG. 8 (conventional example 4).

FIG. 8 is a block circuit diagram showing the schematic structure of the conventional high voltage generation circuit applying both the constant current control system and the constant voltage control system.

In FIG. 8, a high voltage control circuit is composed of a step-up transformer 131 which has windings 131a, 131b and 131c, a switching unit 132, a high-voltage rectifier diode 133, a high-voltage capacitor 134, a bleeder resistor 137, a constant voltage/constant current bicontrol unit 135, a current detection unit 139, a voltage detection unit 136 which contains a rectifier diode 136a, a capacitor 136b and a resistor 136c, and a controller 138. The step-up transformer 131, the switching unit 132, the high-voltage rectifier diode 133, the high-voltage capacitor 134, the bleeder resistor 137 and the current detection unit 139 have the same functions as those of the corresponding elements in the high voltage generation circuit shown in FIG. 7. The voltage detection unit 136 is connected to the winding 131c in the step-up transformer 131 so as to detect a voltage generated at the winding 131c.

In the above structure, since the three windings 131a, 131b and 131c in the step-up transformer 131 are magnetically coupled together, a voltage generated at the end of the winding 131b has a voltage value tracking a voltage value at the end of the winding 131c. On the contrary, the voltage generated at the end of the winding 131c has the voltage value tracking the voltage value at the end of the winding 131b. Therefore, when a DC voltage obtained by rectifying and smoothing the output voltage at the end of the winding 131c is monitored by the controller 138, a voltage at an output unit can be calculated.

The constant voltage/constant current bicontrol unit 135 is structured to be able to switch constant voltage controlling and constant current controlling in response to a control signal from the controller 138. In order to perform the constant current controlling by using the current detection unit 139, the controller 138 initially sends the signal to the constant voltage/constant current bicontrol unit 135 so as to constant-current drive the high voltage generation circuit. In such the constant-current driving of the high voltage circuit, an output voltage value of this circuit is monitored by the voltage detection unit 136. Subsequently, the controller 138 switches the constant current controlling to the constant voltage controlling such that the detected output voltage value becomes constant. Then, the controller 138 controls the switching unit 132 such that the high-voltage output voltage generated by the step-up transformer 131 has a desired value.

By structuring as above, according to the conventional example 4 shown in FIG. 8, a high-voltage power supply capable of making, in spite of the high-voltage power supply, appropriate a load current which varies according to environment and the like can be provided.

As described above, the step-up transformer 121 in the conventional example 3 contains the three windings including the voltage detection winding 121c, and the windings 121b and 121c are tracking operated. Similarly, the step-up transformer 131 in the conventional example 4 contains the three windings including the voltage detection winding 131c, and the windings 131b and 131c are tracking operated.

However, these windings are merely coupled together magnetically. Further, since the winding 121b or 131b is used to generate the high voltage, it is wound with an extra fine wire by several thousands turns. On the other hand, since the winding 121c or 131c is used to detect the voltage, it is wound with the wire merely by several tens turns. Therefore, an individual error occurs in relative ratio of output values of, e.g., the windings 121b and 121c. This error directly increases an error in detection level. For this reason, in the conventional structure, there has been a problem that it is difficult to detect both the current and the voltage and also accurately detect the output voltage.

As described above, since the accurately detection of the output voltage is difficult in the conventional examples, it has been supposed that, e.g., the bleeder resistor 117 in the conventional example 2 shown in FIG. 6 is replaced with a voltage detection unit to increase voltage detection accuracy.

FIG. 9 is a block diagram showing the schematic structure of such the conventional high voltage generation circuit. In the drawing, a high voltage control circuit is composed of a step-up transformer 141, a switching unit 142, a high-voltage rectifier diode 143, a high-voltage capacitor 144, a voltage detection unit 146, a constant voltage control unit 145, a current detection unit 149 and a controller 148. As shown in the drawing, the voltage detection unit 146 is structured to detect a voltage of an output unit itself. An output voltage value detected by the voltage detection unit 146 is sent to the constant voltage control unit 145. By structuring as above, an output voltage can be accurately detected.

However, even in the high voltage generation circuit shown in FIG. 9, the current detection unit 149 resultingly detects a current obtained by adding currents respectively flowing in routes C and D to each other. In this case, the route C represents a current loop flowing in the voltage detection unit 146, and the route D represents a load current loop. That is, even if the high voltage generation circuit is structured as shown in FIG. 9, there has been a problem that load current detection accuracy is degraded instead of improvement of voltage detection accuracy.

SUMMARY OF THE INVENTION

An object of the present invention is to provide a high voltage generation apparatus which eliminated the above-described drawbacks.

An another object of the present invention is to provide a high voltage generation apparatus which can supply an optimum and highly accurate load current even if a change according to environment and the like occurs in a load.

A still another object of the present invention is to provide a high voltage generation apparatus which applies both a constant voltage control system and a constant current control system and also can accurately detect a current and a voltage.

Further objects of the present invention will become apparent by the following description based on the attached drawings and the following claims.

DETAILED DESCRIPTION OF PREFERRED EMBODIMENTS (First Embodiment)

Initially, the first embodiment of the present invention will be explained hereinafter with reference to FIG. 1.

Figure 1:
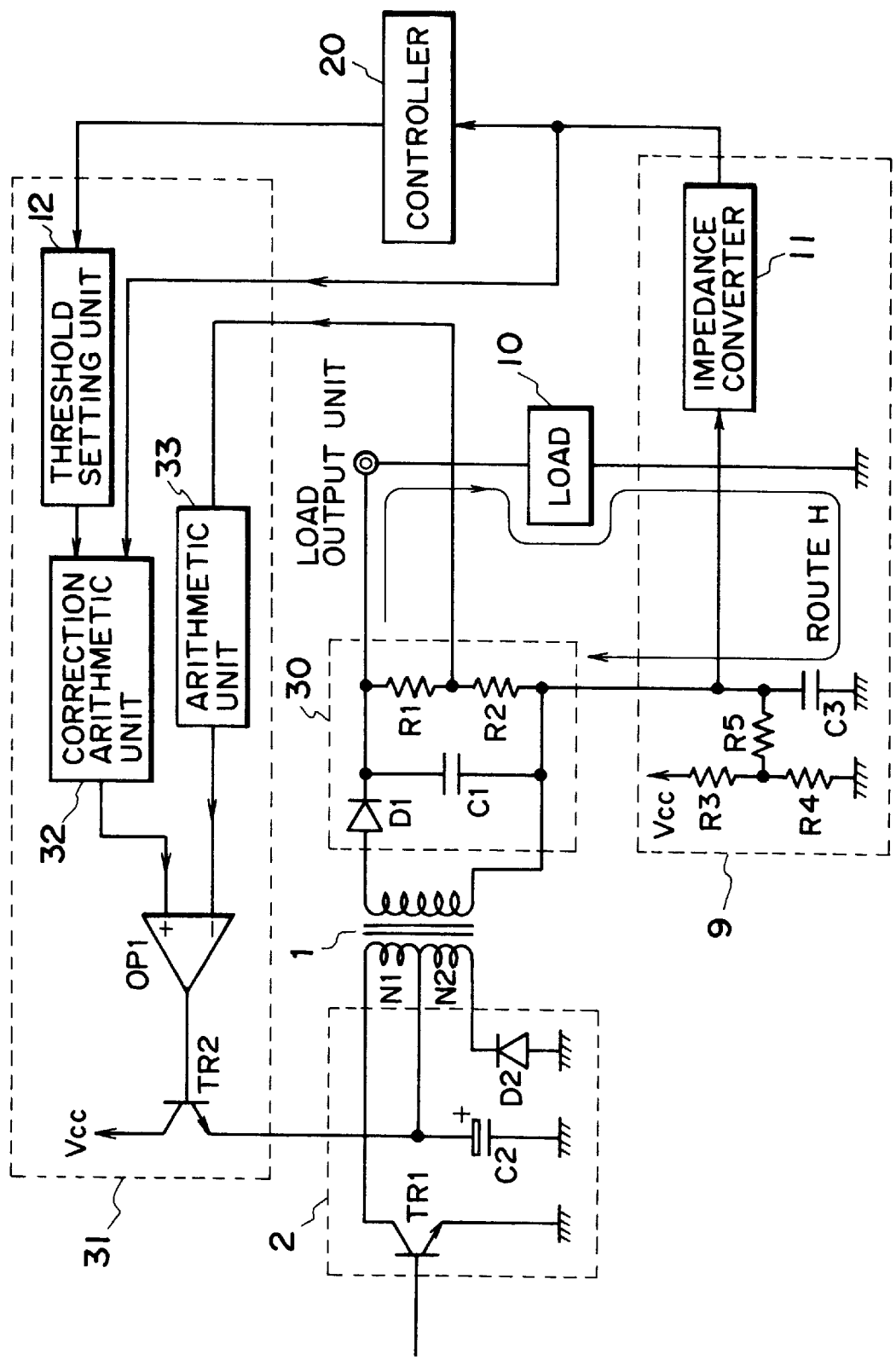
FIG. 1 is a circuit diagram showing the schematic structure of a high voltage generation circuit according to a first embodiment of the present invention.

FIG. 1 is a diagram showing the schematic structure of a high voltage generation circuit according to the present embodiment. In the drawing, a high voltage control circuit is composed of a step-up transformer 1 which generates a high voltage, a switching unit 2 which acts as a switching means for driving the step-up transformer, a constant voltage control unit 31 which acts as a first control means for controlling a switching state of the switching unit 2, a rectifier 30 which acts as a rectifier means containing resistors R1 and R2 for detecting a voltage signal being a factor to be used to calculate a ground voltage (potential) of a load output unit, a current detection unit 9 which acts as a current detection means for detecting a current (load current) flowing in a load 10, and a controller 20 which acts as a second control means for controlling the constant voltage control unit 31 according to a detection signal of the current detection unit 9.

The switching unit 2 is composed of a transistor TR1, a capacitor C2 and a diode D2, and connected to the step-up transformer 1 and the constant voltage control unit 31. Thus, a clock of predetermined frequency and predetermined duty ratio is inputted from a not-shown clock generator to the base of the transistor TR1, whereby the step-up transformer 1 is switching-driven by the transistor TR1. Input windings N1 and N2 of the step-up transformer 1 are bifilar windings and tightly coupled together. These windings N1 and N2 and the diode D2 constitute a snubber circuit. Thus, when a collector voltage of the transistor TR1 becomes twice as high as an input voltage (i.e., emitter voltage of transistor TR2), the diode D2 is conducted to clamp the collector voltage of the transistor TR1. The emitter voltage of the transistor TR2 is smoothed by the capacitor C2, whereby the voltage smoothed by the capacitor C2 is applied to the step-up transformer 1.

The step-up transformer 1 which was switching-driven at the predetermined input voltage by the switching unit 2 boosts the input voltage to generate the high voltage of a predetermined pulsating waveform. Since the rectifier 30 is connected to an output side of the step-up transformer 1, the pulsating-waveform high voltage generated by the step-up transformer 1 is rectified and smoothed by the rectifier 30 containing therein a high-voltage rectifier diode D1, a high-voltage capacitor C1 and the resistors R1 and R2, thereby generating a DC high voltage. Since an output side of the rectifier 30 is connected to the load output unit which outputs the high voltage to the load 10 operated by obtaining power from a drive circuit in an image formation apparatus, the DC high voltage generated by the rectifier 30 is outputted to the load 10 through the load output unit.

Since the output voltage generated by the rectifier 30 is always monitored by the resistors R1 and R2 contained in the rectifier 30, the high-voltage output voltage is converted into a low-voltage detection signal level by the resistors R1 and R2. Further, each of the resistors R1 and R2 also has a function as a bleeder resistor for discharging an electrical charge refreshed (or charged) in the high-voltage capacitor C1 by the step-up transformer 1 and the high-voltage rectifier diode D1. A detection voltage obtained in voltage division by the resistors R1 and R2 (to be referred as R1R2 division voltage hereinafter) does not directly represent a ground potential of the load output unit since the resistor R2 is not directly grounded. Instead, the R1R2 division voltage represents a value univocally determined according to both a potential at a portion where the current detection unit 9 and the rectifier 30 are connected to each other and a potential at the load output unit.

In order to correct a detection aberration quantity of the load output voltage occurred since one end of the resistor R2 does not have the ground potential, the high voltage generation circuit in the present embodiment corrects a reference value generated based on data sent by the controller 20, by using a load current detection value.

The resistors R1 and R2 in the rectifier 30 are connected to an arithmetic unit 33 in the constant voltage control unit 31, and the R1R2 division voltage is monitored by the arithmetic unit 33. Further, the current detection unit 9 is connected to a correction arithmetic unit 32 in the constant voltage control unit 31 and the controller 20, and a detection signal of the load current detected by the current detection unit 9 is monitored by the correction arithmetic unit 32 and the controller 20. Thus, the constant voltage correction unit 31 performs the constant voltage controlling by comparing and controlling output signals of the arithmetic unit 33 and the correction arithmetic unit 32.

The constant voltage control unit 31 connected to the switching unit 2 and the controller 20 is composed of a transistor TR2 for performing a series regulator operation, the arithmetic unit 33 for monitoring the R1R2 division voltage, the correction arithmetic unit 32 for monitoring the detection signal of the load current, an operational amplifier OP1 for performing comparison calculation controlling of the output signals of the arithmetic unit 33 and the correction arithmetic unit 32, and a threshold setting unit 12 for generating a predetermined reference voltage based on the data sent from the controller 20.

The controller 20 sends the data to the threshold setting unit 12 to generate a desired load output voltage. According to the data sent from the controller 20, the threshold setting unit 12 generates a predetermined threshold voltage and outputs it to the correction arithmetic unit 32. Also, the load current detection value detected by the current detection unit 9 is outputted to the correction arithmetic unit 32. Thus, the correction arithmetic unit 32 corrects the threshold voltage and the current detection value according to a predetermined arithmetic expression, and generates the reference voltage for a constant voltage operation of the load output unit. The arithmetic unit 33 shifts the voltage value of the R1R2 division voltage according to a predetermined arithmetic expression, and converts it into a voltage value capable of being comparison-controlled with the reference voltage. The operational amplifier OP1 always monitors the detection signal of the load output voltage outputted from the correction arithmetic unit 32, and thus drive-controls the transistor TR2 such that the voltage value of the load output unit becomes a value univocally determined according to the reference voltage.

A DC current (i.e., load current) flowing in the load 10 connected to the load output unit constitutes a current loop such as a route H shown in FIG. 1. The load current is detected by the current detection unit 9 connected to the rectifier 30 and constituting a part of the route H. The load current flows in resistors R3 and R4. Then, the load current is detected when it flows in a resistor R5. For example, if constants of the resistors are set to be R3=10KΩ, R4=2.7KΩ and R5=180KΩ, the voltage divided by the resistors R3 and R4 hardly varies due to the load current, and the voltage lowered by a voltage drop occurred when the load current flows in the resistor R5 is sent to the controller 20 as load current information. That is, the resistor R5 mainly acts as the current detection resistor. However, since the load current is a microcurrent or an extra fine current (up to 20 $\mu$A), if the connected controller 20 does not have a high-impedance input characteristic, the current erroneously flows therein and an error occurs. For this reason, the current detection unit 9 is connected to the controller 20 through an impedance converter 11 having both a high-impedance input characteristic and a low-impedance output characteristic. Further, the current detection unit is grounded through a capacitor C3 in AC environment.

The controller 20 sequentially varies the data to be sent to the threshold setting unit 12 in the constant voltage control unit 31 such that the desired DC current flows in the load 10, and thus shifts the constant voltage value of the load output unit. The load current value at that time is monitored by the current detection unit 9. Such a process is repeated until the load current value coincides with the desired one. Thus, the high-voltage power supply of the constant voltage control system capable of flowing the desired current to the load 10 of which state variously changes can be provided.

Figure 9:
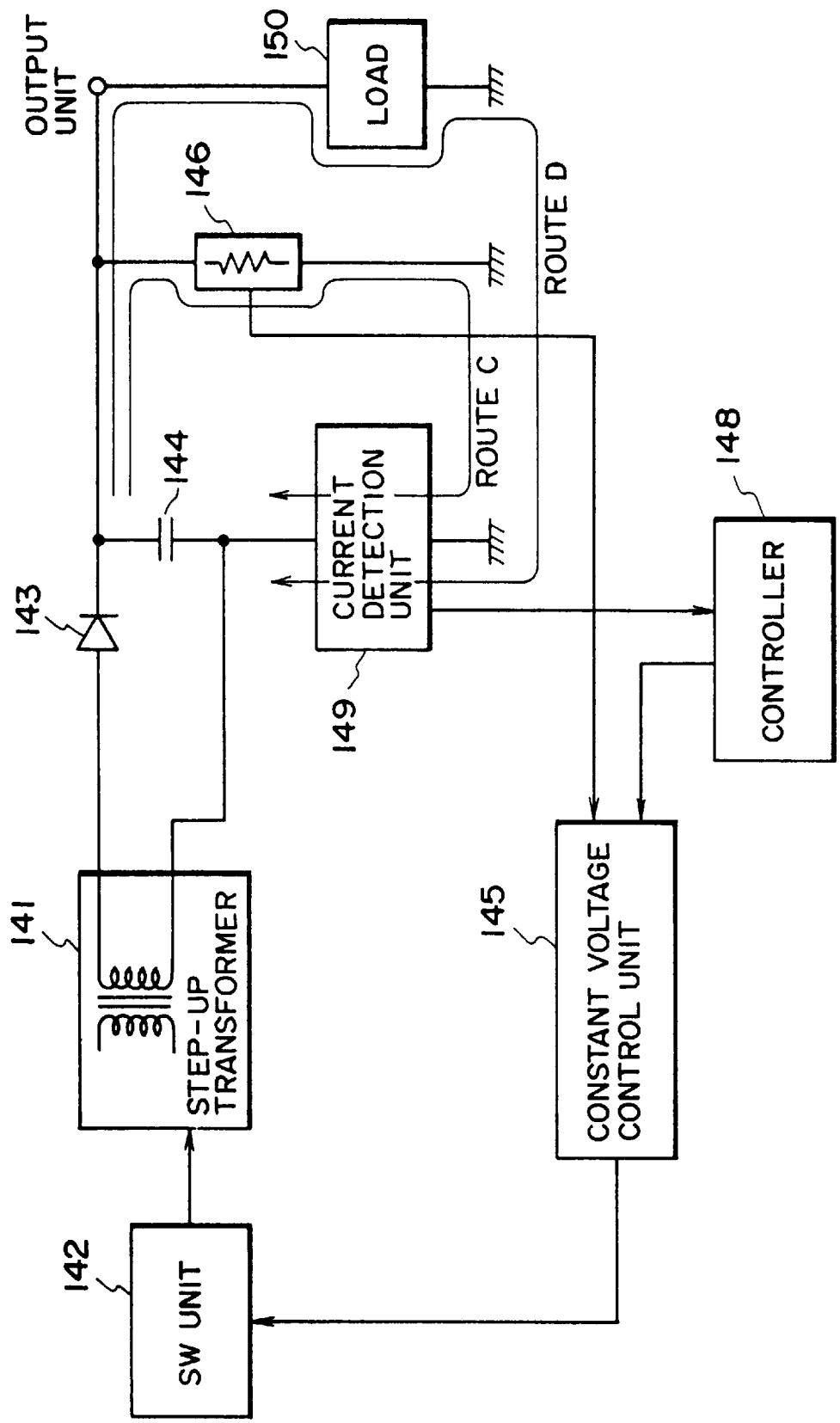
FIG. 9 is a block diagram showing the schematic structure of a conventional high voltage generation circuit (conventional example 5).

As described above, according to the present embodiment, the resistors R1 and R2 in the rectifier 30 are not grounded but are floating on the current detection unit 9. Thus, unlike a conventional high voltage generation circuit (FIG. 9), the current detection unit 9 can detect only the load current with high accuracy. Further, since the load output unit and the voltage detection unit are structured in accordance with the voltage occurred by the same winding of the step-up transformer, the resistors R1 and R2 can detect the voltage signal which is a factor to calculate the load output voltage, with high accuracy. Thus, by calculating the detected voltage signal together with the detection signal of the current detection unit 9, the potential at the load output unit can be detected with high accuracy. Further, since the high voltage generation circuit has both load current and load voltage detection control means, it can easily cause these means to operate respectively as current and voltage limiters. Therefore, as compared with the conventional examples, the high voltage generation circuit of the constant voltage control system capable of supplying the high-accuracy and optimum load current value can be provided.

Furthermore, by applying to the image formation apparatus such the high voltage generation circuit as structured above, for example, it can derive an effect that a defective operation such as defective transferring due to the variation of a transferring current can be prevented thereby causing each unit in the image formation apparatus to appropriately operate.

Furthermore, in the present embodiment, although the rectifier is structured as a voltage single rectifier connection as a matter of convenience, a voltage double or doubler rectifier connection may be used. Although the operational amplifier is used in the constant voltage control unit, any other comparison arithmetic means may be used. Further, the bifilar-winding transformer is used as the step-up transformer 1, a step-up transformer containing a single input winding may be used.

(Second Embodiment)

Figure 2:
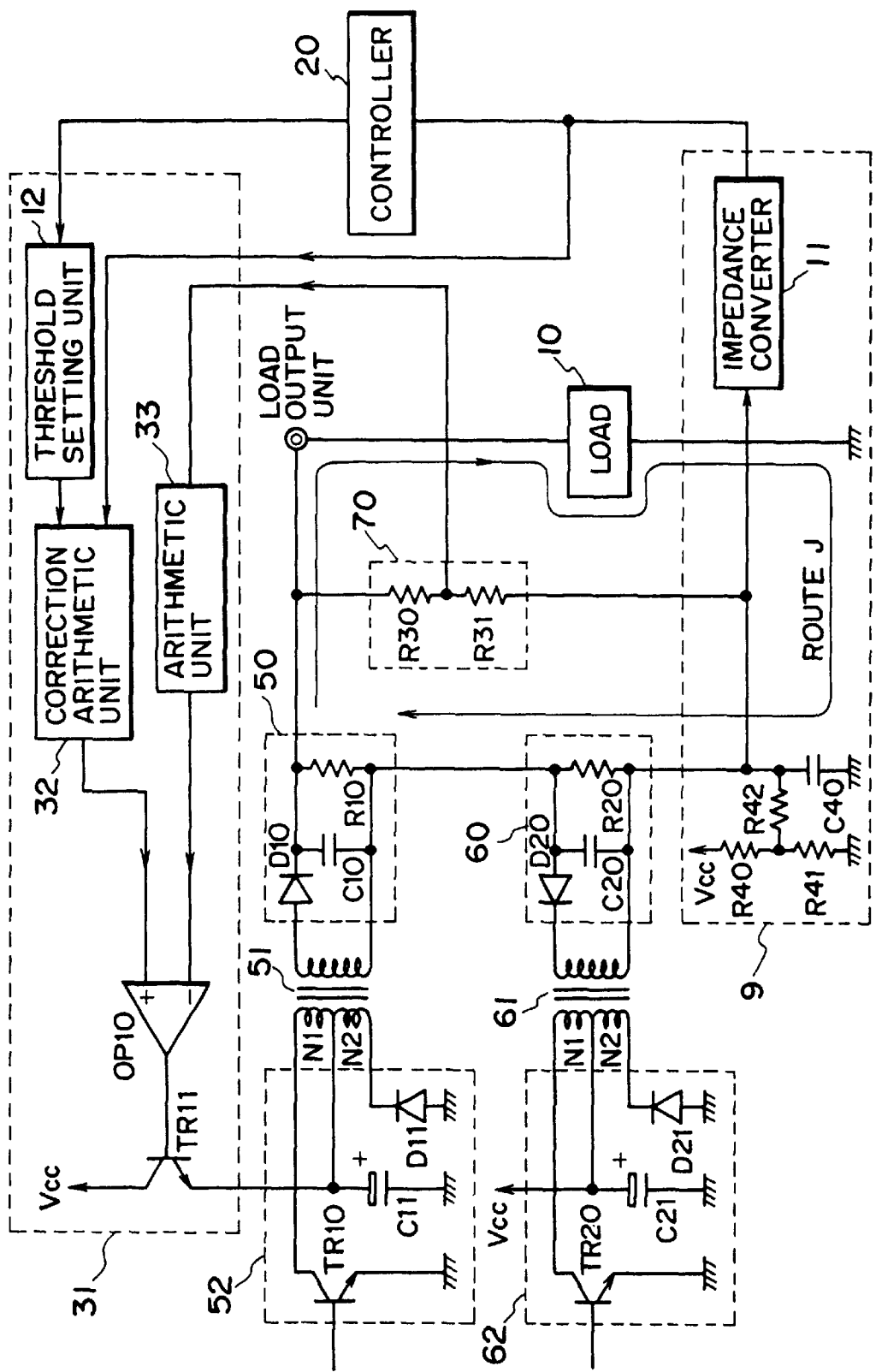
FIG. 2 is a circuit diagram showing the schematic structure of a high voltage generation circuit according to a second embodiment of the present invention.

Subsequently, the second embodiment of the present invention will be explained with reference to FIG. 2. FIG. 2 is a diagram showing the schematic structure of a high voltage generation circuit according to the present embodiment. The present embodiment is directed to a power supply in which a positive-bias power supply is superimposed on a negative-bias power supply to be able to output either positive and negative voltages. In this power supply, the resistors R1 and R2 and the correction arithmetic unit 32 used in the first embodiment are applied to derive the same effect as in the first embodiment even for the bias power supply capable of outputting the positive and negative voltages.

In the drawing, a high voltage control circuit consists of a positive bias generation unit and a negative bias generation unit. The positive bias generation unit is composed of a step-up transformer 51 for generating a high voltage, a switching unit 52 for driving the step-up transformer, a constant voltage control unit 31 acting as a first control means for controlling a switching state of the switching unit 52, a rectifier 50 for rectifying an output of the step-up transformer 51, a voltage detection unit 70 for detecting a voltage signal being a factor for calculating a ground voltage (potential) of a load output unit, a current detection unit 9 for detecting a current (load current) flowing in a load 10, and a controller 20 acting as a second control means for controlling the constant voltage control unit 31 according to a detection signal of the current detection unit 9.

On the other hand, the negative bias generation unit is structured not to control the output voltage, and is composed of a step-up transformer 61 for generating a high voltage, a switching unit 62 for driving the step-up transformer, and a rectifier 60 for rectifying an output of the step-up transformer 61.

A positive bias outputting state will be explained hereinafter. The switching unit 52 is composed of a transistor TR10, a capacitor C11 and a diode D11, and is connected to the step-up transformer 51 and the constant voltage control unit 31. When a clock of predetermined frequency and predetermined duty ratio is inputted from a not-shown clock generator to the base of the transistor TR10, the step-up transformer 51 is switching-driven by the transistor TR10. Input windings N1 and N2 of the step-up transformer 51 are bifilar windings and tightly coupled together. These windings N1 and N2 and the diode D11 constitute a snubber circuit. Thus, when a collector voltage of the transistor TR10 becomes twice as high as an input voltage (i.e., emitter voltage of transistor TR11), the diode D11 is conducted to clamp the collector voltage of the transistor TR10. The emitter voltage of the transistor TR11 is smoothed by the capacitor C11, whereby the voltage smoothed by the capacitor C11 is applied to the step-up transformer 51.

The step-up transformer 51 which was switching-driven at the predetermined input voltage by the switching unit 52 boosts the input voltage to generate the high voltage of a predetermined pulsating waveform at a secondary winding. Since the rectifier 50 is connected to an output side of the step-up transformer 51, the pulsating-waveform high voltage generated by the step-up transformer 51 is rectified and smoothed by the rectifier 50 containing a high-voltage rectifier diode D10, a high-voltage capacitor C10 and a resistor R10, thereby generating a DC high voltage (positive bias).

Since an output side of the rectifier 50 is connected to the load output unit which outputs the high voltage to the load 10 in an image formation apparatus, the DC high voltage generated by the rectifier 50 is outputted to the load 10 and the voltage detection unit 70 through the load output unit. However, the output voltage is applied such that the current flows in a route passing through a resistor R20 in the rectifier 60, a high-voltage voltage drop occurs at the resistor R20 having high resistance. That is, on the premise that a grounding point has a reference voltage of 0 V, the positive-potential high voltage is generated on a load output unit side of the resistor R10 and the negative-potential high voltage is generated on a resistor R20 side of the resistor R10.

Since the output voltage generated in the load output unit is always monitored by resistors R30 and R31 contained in the voltage detection unit 70, the high-voltage output voltage is converted into a lowvoltage detection signal level by these resistors. A detection voltage obtained in voltage division by the resistors R30 and R31 (to be referred as R30R31 division voltage hereinafter) does not directly represent a ground potential of the load output unit since the resistor R31 is not grounded. Instead, the R30R31 division voltage represents a value univocally determined according to both a potential at a portion where the current detection unit 9 and the rectifier 60 are connected to each other and a potential at the load output unit.

In order to correct a detection aberration quantity of the load output voltage occurred since one end of the resistor R31 does not have the ground potential, the high voltage generation circuit in the present embodiment corrects a reference value generated based on data sent by the controller 20, according to a load current detection value.

The resistors R30 and R31 are connected to an arithmetic unit 33 in the constant voltage control unit 31, and the R30R31 division voltage is monitored by the arithmetic unit 33. Further, the current detection unit 9 is connected to a correction arithmetic unit 32 in the constant voltage control unit 31 and the controller 20, and a detection signal of the load current detected by the current detection unit 9 is monitored by the correction arithmetic unit 32 and the controller 20. Thus, the constant voltage correction unit 31 performs the constant voltage controlling by comparing and controlling output signals of the arithmetic unit 33 and the correction arithmetic unit 32.

The constant voltage control unit 31 connected to the switching unit 52 and the controller 20 is composed of the transistor TR11 for performing a series regulator operation, the arithmetic unit 33 for monitoring the R30R31 division voltage, the correction arithmetic unit 32 for monitoring the detection signal of the load current, an operational amplifier OP10 for performing comparison calculation controlling of the output signals of the arithmetic unit 33 and the correction arithmetic unit 32, and a threshold setting unit 12 for generating a predetermined reference voltage based on the data sent from the controller 20.

The controller 20 sends the data to the threshold setting unit 12 such that the load output voltage becomes a predetermined value. According to the data sent from the controller 20, the threshold setting unit 12 generates a predetermined threshold voltage and outputs it to the correction arithmetic unit 32. The load current detection value detected by the current detection unit 9 is outputted to the correction arithmetic unit 32. Thus, the correction arithmetic unit 32 corrects the threshold voltage and the current detection value according to a predetermined arithmetic expression, and generates the reference voltage for a constant voltage operation of the load output unit. The arithmetic unit 33 shifts the voltage value of the R30R31 division voltage according to a predetermined arithmetic expression, and converts it into a voltage value capable of being comparison-controlled with the reference voltage. The operational amplifier OP10 always monitors the detection signal of the load output voltage outputted from the correction arithmetic unit 32, and thus drive-controls the transistor TR11 such that the voltage value of the load output unit becomes a value univocally determined according to the reference voltage.

A DC current (load current) flowing in the load 10 formed in the load output unit constitutes a current loop such as a route J shown in FIG. 2. The load current is detected by the current detection unit 9 connected to the rectifier 60 and constituting a part of the route J. The load current flows in resistors R40 and R41. Then, the load current is detected when it flows in a resistor R42. For example, if constants of the resistors are set to be R40=10KΩ, R41=2.7KΩ and R42=180KΩ, the voltage divided by the resistors R40 and R41 hardly varies due to the load current, and the load current and the voltage lowered by a voltage drop of the resistor R42 are sent to the controller 20 as load current information. That is, the resistor R42 mainly acts as the current detection resistor. However, since the load current is a microcurrent (up to 20 $\mu$A), if the connected controller 20 does not have a high-impedance input characteristic, the current erroneously flows therein and an error occurs. For this reason, the current detection unit 9 is connected to the controller 20 through an impedance converter 11 having both a high-impedance input characteristic and a low-impedance output characteristic. Further, the current detection unit is grounded through a capacitor C40 in AC environment.

The controller 20 sequentially varies the data to be sent to the threshold setting unit 12 in the constant voltage control unit 31 such that the desired DC current flows in the load 10, and thus shifts the constant voltage value of the load output unit. The load current value at that time is monitored by the current detection unit 9. Such a process is repeated until the load current value coincides with the desired one. Thus, the high-voltage power supply of the constant voltage control system capable of flowing the desired current to the load 10 of which state variously changes can be provided.

The negative bias generation unit will be explained hereinafter. The switching unit 62, the step-up transformer 61 and the rectifier 60 have the same functions as those of the switching unit 52, the step-up transformer 51 and the rectifier 50 in the positive bias generation unit, respectively. A high voltage negative bias is generated on both the ends of the resistor R20.

A concrete example will be explained. The threshold voltages are set respectively for the data (00h to FFh) which are sent from the controller 20 to the threshold setting unit 12, as (00h→5.66 V, 12h →6.51 V, 90h→12.45V, FFh→17.69 V). Further, R30=40MΩ, R31=560KΩ, R40= 10KΩ, R41=2.7KΩ, R42=180KΩ and $V_{cc}$=21.5 V are set respectively. Furthermore, the arithmetic expression of the arithmetic unit 33 is set as "load detection value after correction=5306×load output unit voltage+0.379×load current detection value+2.498".

Furthermore, the arithmetic expression of the correction arithmetic unit 32 for calculating the load current detection value and a threshold is set as "reference voltage (data) after correction=8264+6.0106×data (decimal number)/255+ 0.38427×load current detection value".

By using the arithmetic units set as above, following results can be obtained.

I. Load Resistance: 1000MΩ
  (1) Threshold Setting (00h)
    load output voltage: 67 V
    load current: 0.067 $\mu$A
    load current detection value: 4.56 V
    R30R31 division voltage: 5.42 V
    load detection voltage after correction: 4.58 V
    reference voltage after correction: 4.58 V
  (2) Threshold Setting (12h)
    load output voltage: 146 V
    load current: 0.146 $\mu$A
    load current detection value: 4.54 V
    R30R31 division voltage: 6.49 V
    load detection voltage after correction: 4.99 V
    reference voltage after correction: 5.00 V
  (3) Threshold Setting (90h)
    load output voltage: 706 V
    load current: 0.706 $\mu$A
    load current detection value: 4.44 V
    R30R31 division voltage: 14.13 V
    load detection voltage after correction: 7.93 V
    reference voltage after correction: 7.93 V
  (4) Threshold Setting (FFh)
    load output voltage: 1199 V
    load current: 1.199 $\mu$A
    load current detection value: 4.35 V
    R30R31 division voltage: 20.84 V
    load detection voltage after correction: 10.51 V
    reference voltage after correction: 10.51 V II. Load Resistance: 100MΩ
  (1) Threshold Setting (00h)
    load output voltage: 66 V
    load current: 0.66 $\mu$A
    load current detection value: 4.45 V
    R30R31 division voltage: 5.30 V
    load detection voltage after correction: 4.53 V
    reference voltage after correction: 4.54 V
  (2) Threshold Setting (12h)
    load output voltage: 146 V
    load current: 1.46 $\mu$A
    load current detection value: 4.31 V
    R30R31 division voltage: 6.27 V
    load detection voltage after correction: 4.91 V
    reference voltage after correction: 4.91 V
  (3) Threshold Setting (90h)
    load output voltage: 705 V
    load current: 7.05 $\mu$A
    load current detection value: 3.29 V
    R30R31 division voltage: 12.98 V
    load detection voltage after correction: 7.49 V
    reference voltage after correction: 7.48 V
  (4) Threshold Setting (FFh)
    load output voltage: 1197 V
    load current: 11.97 $\mu$A
    load current detection value: 2.39 V
    R30R31 division voltage: 18.88 V
    load detection voltage after correction: 9.75 V
    reference voltage after correction: 9.76 V III. Load Resistance: 30MΩ
  (1) Threshold Setting (00h)
    load output voltage: 66 V
    load current: 2.2 $\mu$A
    load current detection value: 4.17 V
    R30R31 division voltage: 5.02 V
    load detection voltage after correction: 4.43 V
    reference voltage after correction: 4.43 V (2) Threshold Setting (12h)
   load output voltage: 146 V
   load current: 4.87 μA
   load current detection value: 3.69 V
   R30R31 division voltage: 5.65 V
   load detection voltage after correction: 4.67 V
   reference voltage after correction: 4.67 V
(3) Threshold Setting (90h)
   load output voltage: 702 V
   load current: 23.4 μA
   load current detection value: 0.31 V
   R30R31 division voltage: 9.99 V
   load detection voltage after correction: 6.34 V
   reference voltage after correction: 6.34 V
(4) Threshold Setting (FFh)
   load output voltage: 1192 V
   load current: 39.7 μA
   load current detection value: −2.67 V
   R30R31 division voltage: 13.82 V
   load detection voltage after correction: 7.81 V
   reference voltage after correction: 7.81 V Under the condition that the load output voltage is constant, the load current varies according to variation of the load resistance, and also the R30R31 division voltage varies. However, since the reference voltage and the R30R31 division voltage are corrected by using the arithmetic unit, the load output voltage does not vary even if the load resistance varies.

However, since the extent of the detection current is limited to 20 μA or so in the above setting, in the case where the threshold setting is (FFh) and the load resistance is 30MΩ, the load current detection value becomes a minus value.

As described above, according to the present embodiment, the detection resistor R31 is not grounded but is floating on the current detection unit 9. Thus, unlike the conventional high voltage generation circuit (FIG. 9), the current detection unit 9 can detect only the load current with high accuracy. Further, since the resistors R30 and R31 are directly connected to the load output unit and the current detection unit 9, the potential at the load output unit can be kept constant irrespective of the voltage drop value occurred at the resistor R20 in the negative bias generation circuit. Furthermore, the resistors R30 and R31 can detect with high accuracy the voltage signal which is a factor to calculate the load output voltage. Thus, by calculating the detected voltage signal together with the detection signal of the current detection unit 9, the potential at the load output unit can be detected with high accuracy. Furthermore, since the high voltage generation circuit has both load current and load voltage detection control means, it can easily cause these means to operate respectively as current and voltage limiters. Therefore, as compared with the conventional examples, the high voltage generation circuit of the constant voltage control system capable of supplying the high-accuracy and optimum load current value can be provided.

Furthermore, by applying to the image formation apparatus such the high voltage generation circuit as structured above, for example, it can derive an effect that a defective operation such as defective transferring or the like due to the variation of a transferring current can be prevented thereby causing each unit in the image formation apparatus to appropriately operate.

Furthermore, in the present embodiment, although the rectifier is structured as a voltage single rectifier connection as a matter of convenience, a voltage double or doubler rectifier connection may be used. Although the operational amplifier is used in the constant voltage control unit, any other comparison arithmetic means may be used. Further, the bifilar-winding transformer is used as the step-up transformer, a step-up transformer containing a single input winding may be used.

(Third Embodiment)

Subsequently, the third embodiment of the present invention will be explained with reference to FIG. 3.

Figure 3:
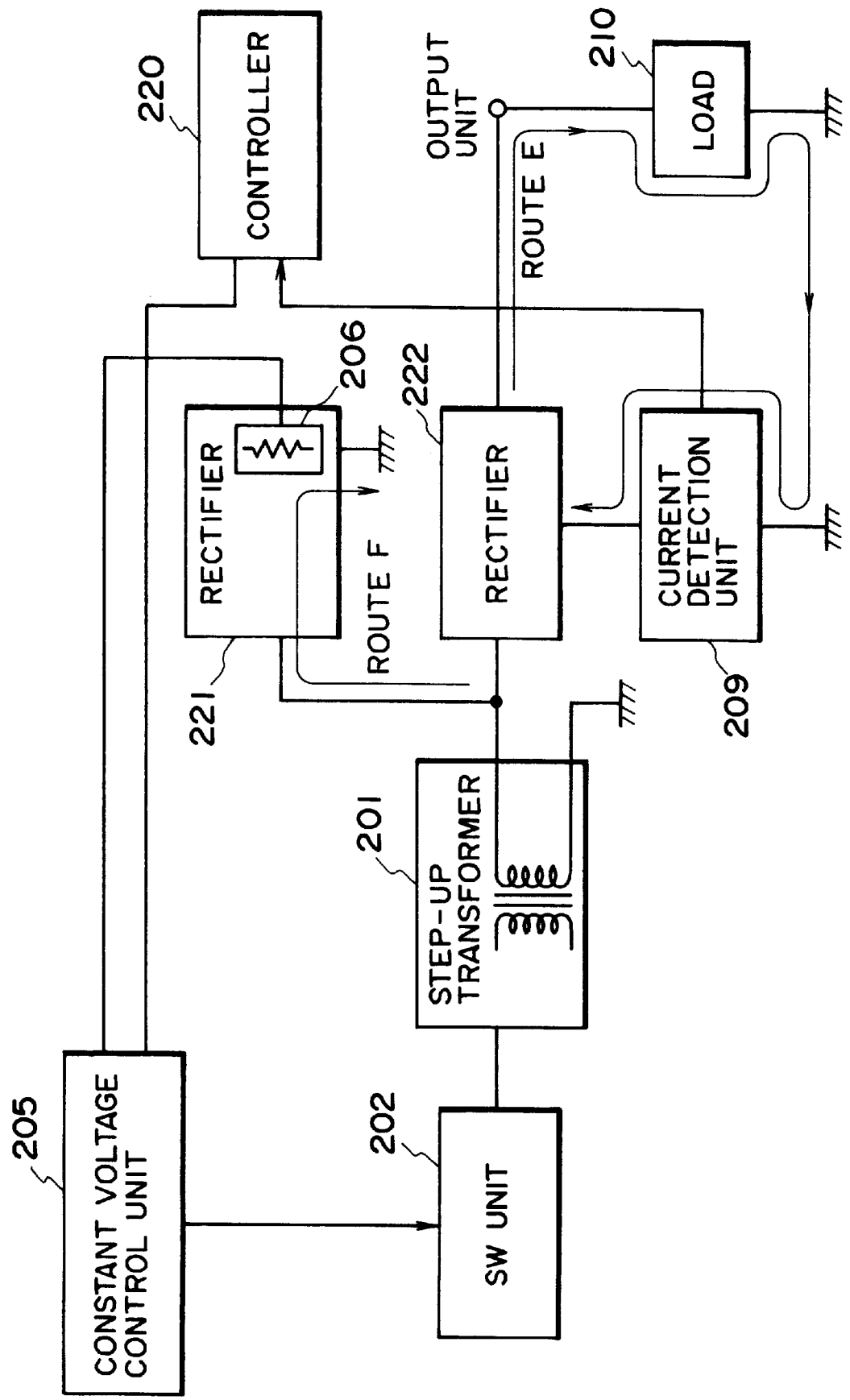
FIG. 3 is a circuit diagram showing the schematic structure of a high voltage generation circuit according to a third embodiment of the present invention.

FIG. 3 is a block circuit diagram showing the schematic structure of a high voltage generation circuit according to the present embodiment.

In the drawing, a high voltage control circuit is composed of a step-up transformer 201 which generates a high voltage, a switching unit 202 which drives the step-up transformer 201, a constant voltage control unit 205 which controls switching timing of the switching unit 202, a rectifier 221 which contains a voltage detection unit 206 acting as a voltage detection means for detecting the output voltage of the step-up transformer 201, a rectifier 222, a current detection unit 209 which detects a current (load current) flowing in a load 210, and a controller 220 which controls the constant current control unit 205 according to a detection signal of the current detection unit 209.

The switching unit 202 is connected to the step-up transformer 201 to switching-drive it at a predetermined frequency and a predetermined duty ratio. The step-up transformer 201 switching-driven by the switching unit 202 at a predetermined input voltage boosts the input voltage to generate the high voltage of a predetermined pulsating waveform. The two rectifiers 221 and 222 are connected in parallel to the output side of the step-up transformer 201. When the pulsating-waveform high voltage generated by the step-up transformer 201 is rectified and smoothed by the rectifiers 221 and 222 each containing a high-voltage rectifier diode and a high-voltage capacitor, DC high voltages are generated respectively. Since the output side of the rectifier 222 is connected to an output unit outputting the high voltage to the load 210 in an image formation apparatus, the high voltage generated by the rectifier 222 is outputted to the load 210 through the output unit.

The high voltage generated by the rectifier 221 is always monitored by the voltage detection unit 206 installed in the rectifier 221. The voltage detection unit 206 contains a bleeder resistor which discharges an electric charge refreshed (or charged) in a contained high-voltage capacitor by the step-up transformer 201 and a contained high-voltage rectifier diode, so as to convert the high-voltage output voltage into a low-voltage detection signal level. An obtained detection signal is outputted from the voltage detection unit 206 in the rectifier 221 to the constant voltage control unit 205.

The constant voltage control unit 205 is connected to the switching unit 202. The constant voltage control unit 205 always monitors the detection signal from the voltage detection unit 206, and controls the switching unit 202 such that the high-voltage output voltage generated by the step-up transformer 201 has a predetermined value (i.e., constant voltage setting value) controllable by the controller 20. At this time, the DC current (load current) flowing in the load 210 connected to an output unit flows in a current loop of a route E shown. The load current is detected by the current detection unit 209 connected to the rectifier 222 and constituting a part of the route E. The current detection unit 209 is connected to the controller 220. Since a load current value detected by the current detection unit 209 is always monitored by the controller 220, the controller 220 sequentially changes the constant voltage setting value of the constant voltage control unit 205 such that the desired DC current flows in the load 210. Thus, a high voltage power source of a constant voltage control system capable of flowing the current at a desired current value to the load 210 of which state variously changes.

As described above, according to the present embodiment, there are provided the two rectifiers for the voltage outputted from the identical winding, and the current route E in which a current flowing in the current detection unit 209 is provided independently of a current route F. Thus, unlike a conventional high voltage generation circuit, the current detection unit 209 can detect only the load current with high accuracy. Further, since the rectifier for load applying and the rectifier for the voltage detecting are independently structured for the voltage generated by the identical winding and the voltage is detected by using only one of these rectifiers, the voltage detection unit 206 can detect the voltage of the output unit 223 with high accuracy. Therefore, as compared with the conventional examples, the high voltage generation circuit of the constant voltage control system capable of supplying a high-accuracy and optimum load current value can be provided.

Furthermore, in cases where such the high voltage generation circuit as structured above is applied to the image formation apparatus, where the load current is constantly controlled in a transferring operation to a transfer paper, and where the constant voltage controlling is performed at timing between the transfer papers, for example, it can derive an effect that a defective operation such as defective transferring or the like due to the variation of a transferring current can be prevented thereby causing each unit in the image formation apparatus to appropriately operate.

(Fourth Embodiment)

Subsequently, the fourth embodiment of the present invention will be explained with reference to FIG. 4.

Figure 4:
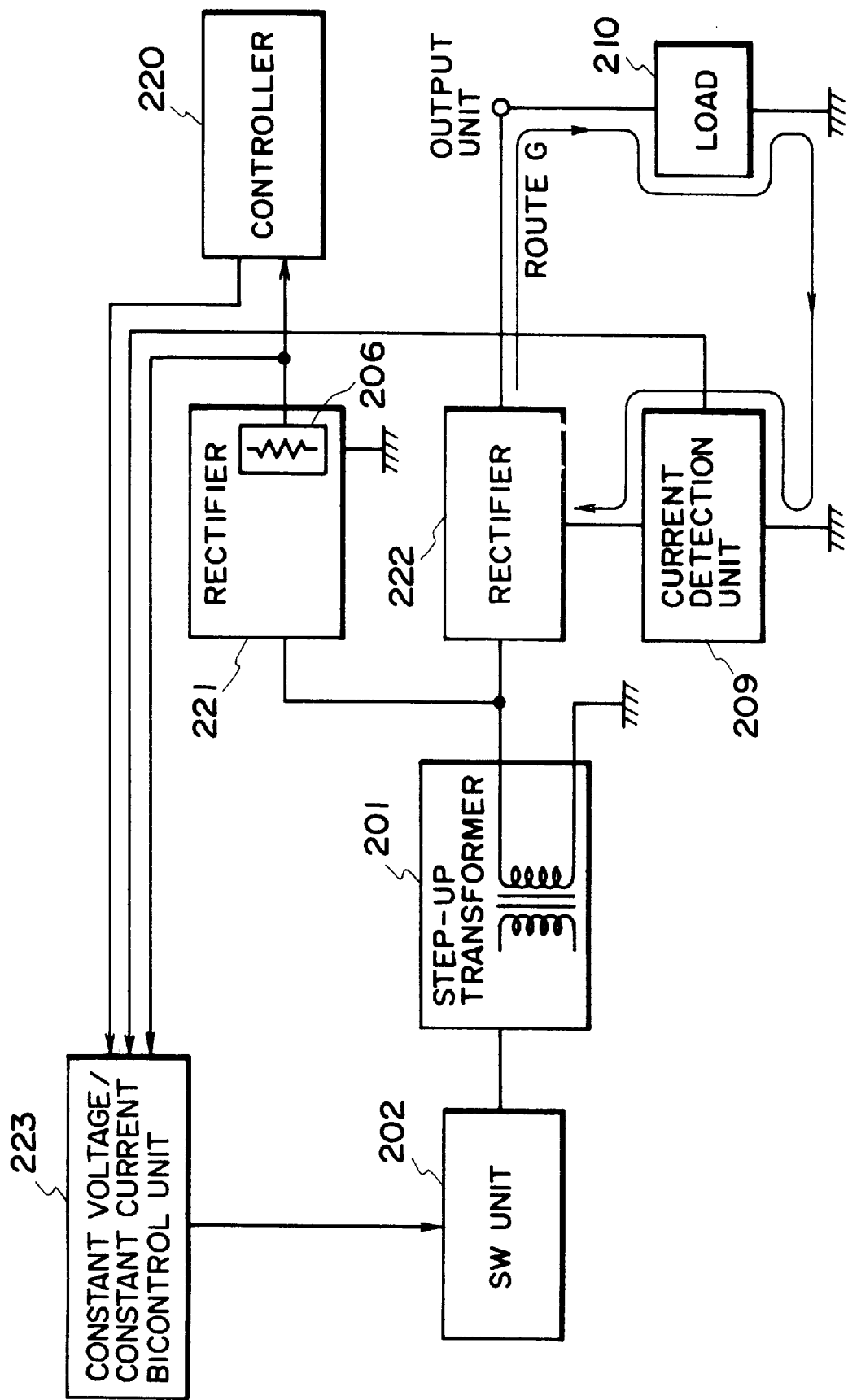
FIG. 4 is a circuit diagram showing the schematic structure of a high voltage generation circuit according to a fourth embodiment of the present invention.
Figure 5:
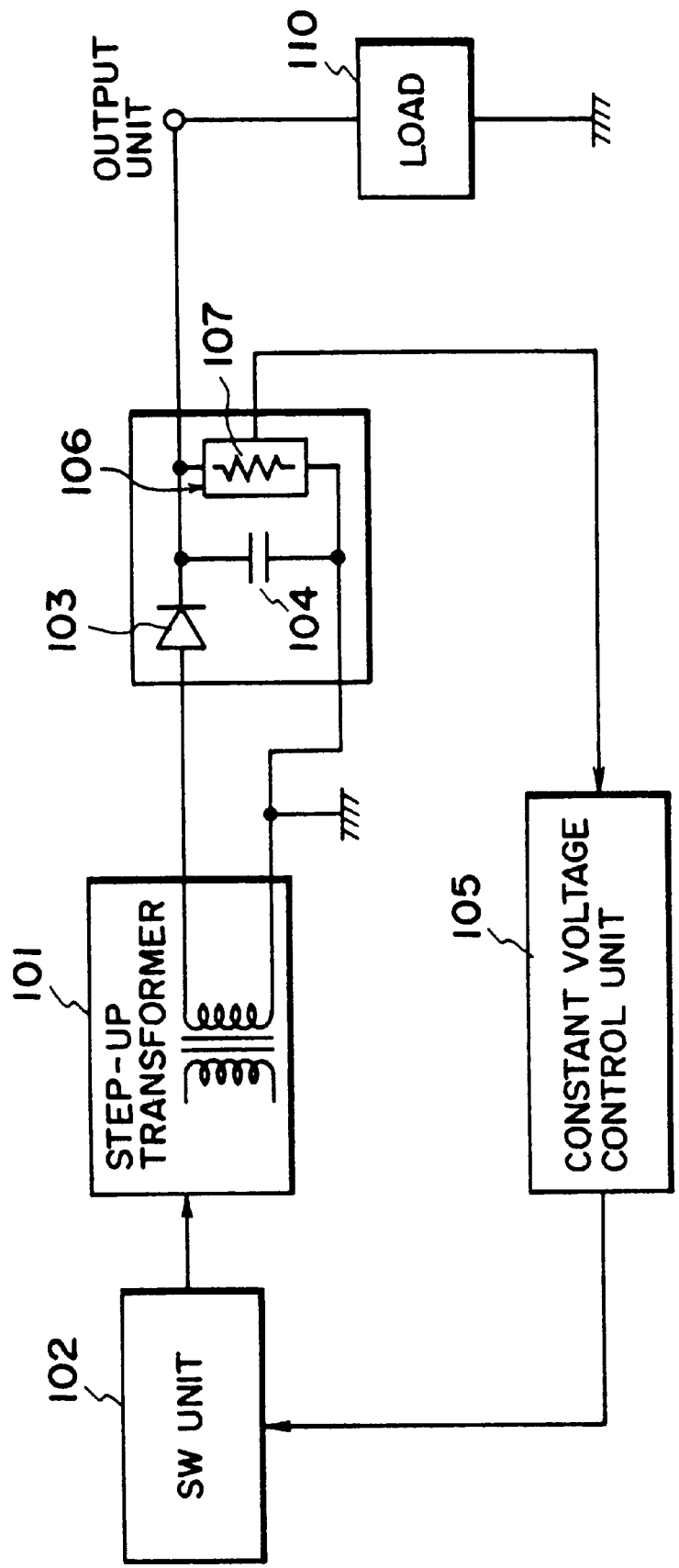
FIG. 5 is a block circuit diagram showing the schematic structure of a conventional high voltage generation circuit (conventional example 1)
Figure 6:
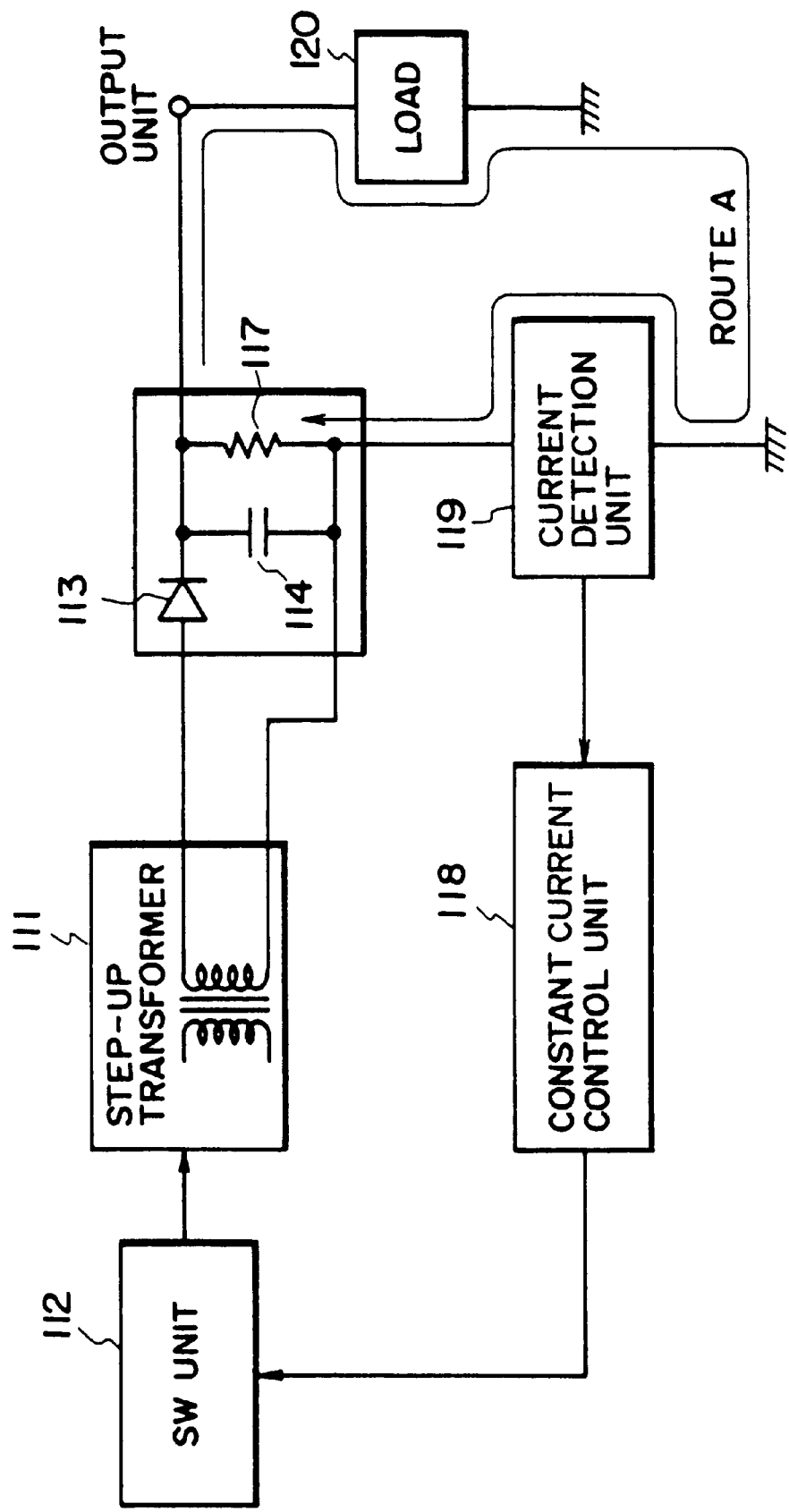
FIG. 6 is a block circuit diagram showing the schematic structure of a conventional high voltage generation circuit (conventional example 2)
Figure 7:
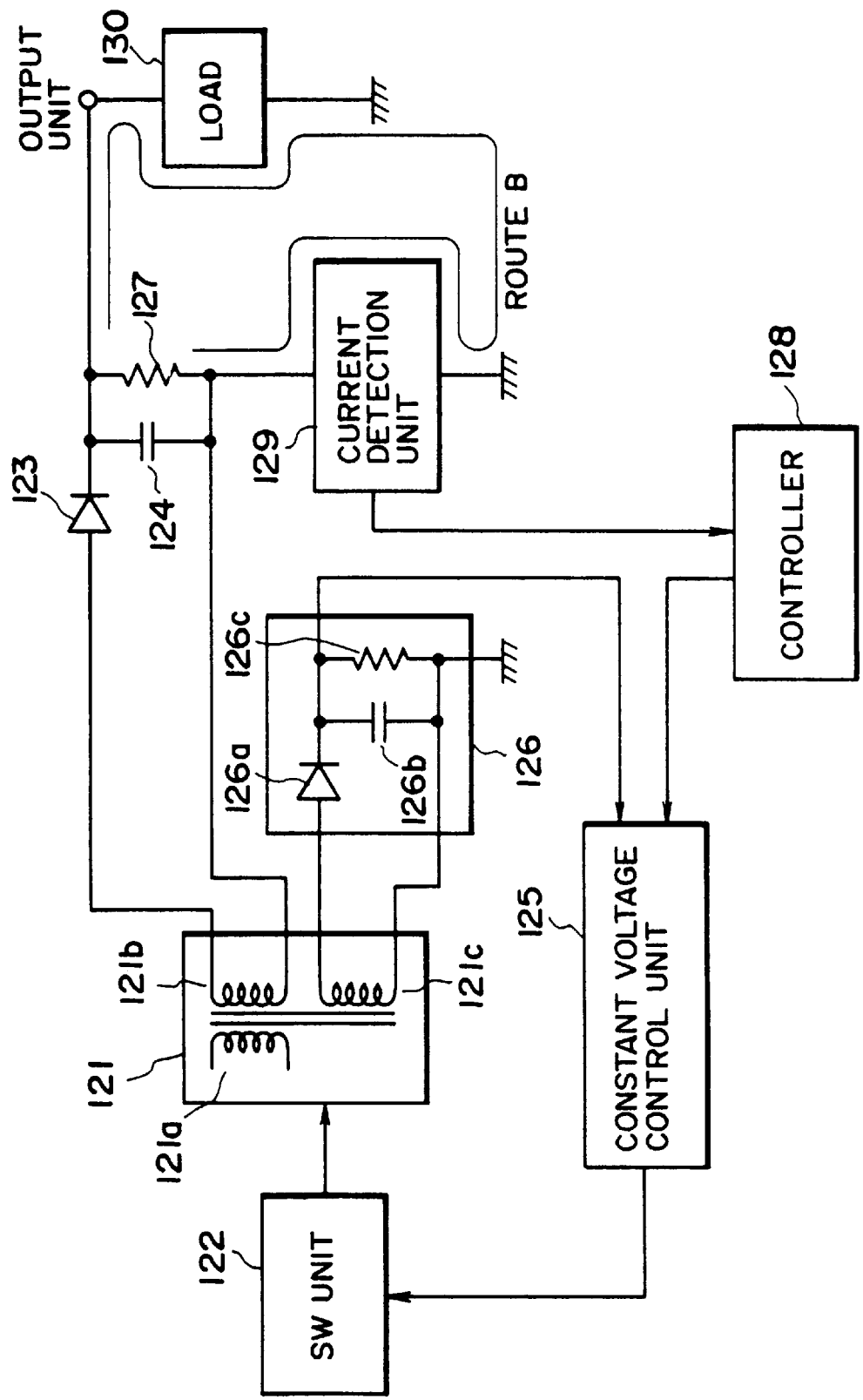
FIG. 7 is a block circuit diagram showing the schematic structure of a conventional high voltage generation circuit (conventional example 3)
Figure 8:
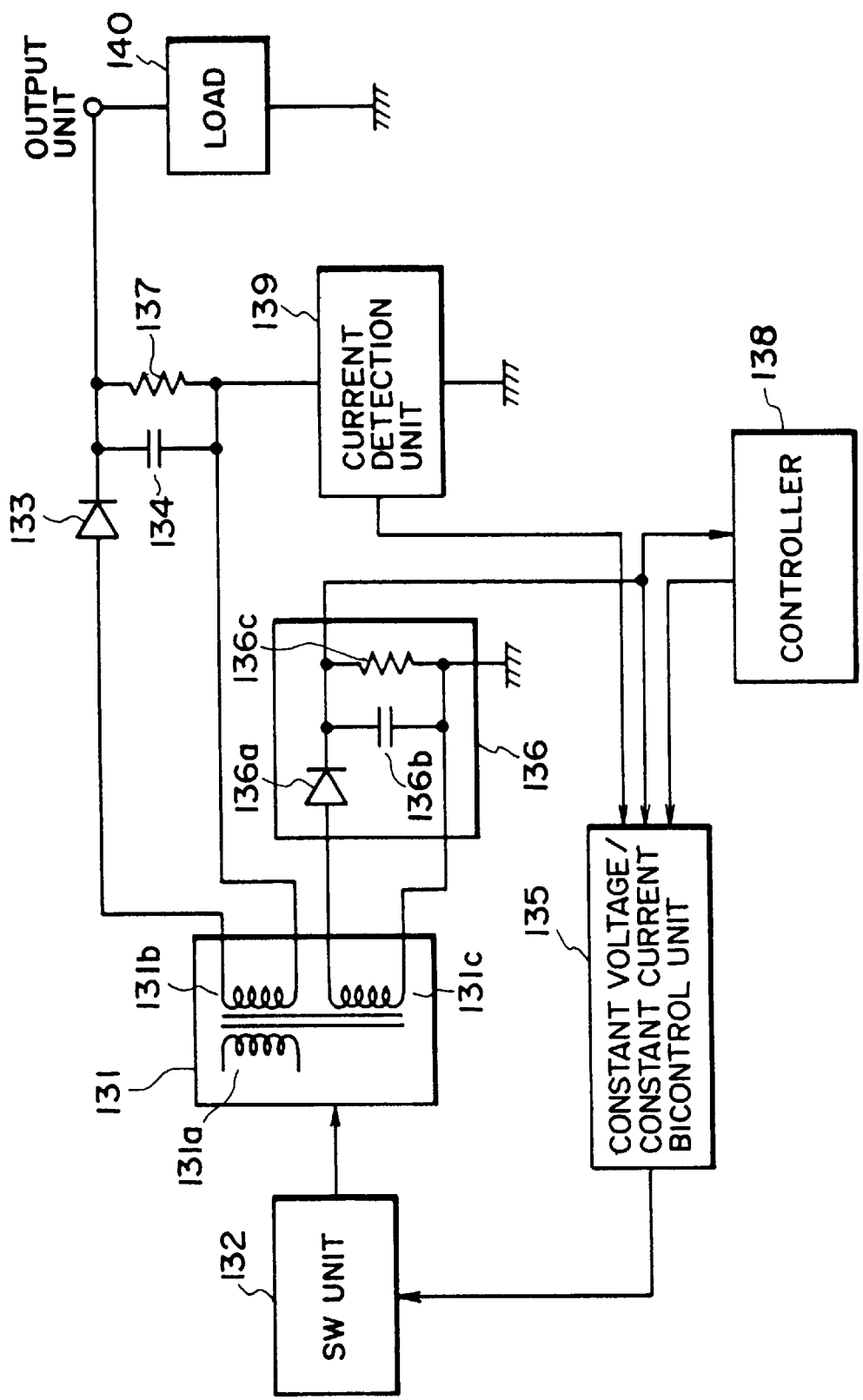
FIG. 8 is a block circuit diagram showing the schematic structure of a conventional high voltage generation circuit (conventional example 4)

FIG. 4 is a block circuit diagram showing the schematic structure of a high voltage generation circuit according to the present embodiment. In FIG. 4, it should be noted that the same elements as those shown in FIG. 3 are added with the same reference numerals.

In the drawing, a high voltage control circuit is composed of a step-up transformer 201 which generates a high voltage, a switching unit 202 which drives the step-up transformer, a constant voltage/constant current bicontrol unit 223 which controls switching timing of the switching unit 202, a rectifier 221 which contains a voltage detection unit 206 for detecting the output voltage of the step-up transformer 201, a rectifier 222, a current detection unit 209 which detects a current (load current) flowing in a load 210, and a controller 220. Unlike the above-described third embodiment, the current detection unit 209 is directly connected to the constant voltage/constant current bicontrol unit 223 instead of the controller 220 in the present embodiment. Further, the voltage detection unit 206 in the rectifier 221 is connected to the constant, voltage/constant current bicontrol unit 223 and the controller 220.

In the above structure, the switching unit 202 is connected to the step-up transformer 201 to switching-drive it at a predetermined frequency and a predetermined duty ratio. The step-up transformer 201 switching-driven by the switching unit 202 at a predetermined input voltage boosts the input voltage to generate the high voltage of a predetermined pulsating waveform. When the pulsating-waveform high voltage generated by the step-up transformer 201 is rectified and smoothed by the rectifiers 221 and 222 each containing a high-voltage rectifier diode and a high-voltage capacitor, DC high voltages are generated respectively. The high voltage generated by the rectifier 222 is outputted to the load 210 in an image formation apparatus through an output unit.

The high voltage generated by the rectifier 221 is always monitored by the voltage detection unit 206 installed in the rectifier 221. The voltage detection unit 206 contains a bleeder resistor which discharges an electric charge refreshed (or charged) in a contained high-voltage capacitor by the step-up transformer 201 and a contained high-voltage rectifier diode, to convert the high-voltage output voltage into a low-voltage detection signal level. An obtained detection signal is sent to the constant voltage/constant current bicontrol unit 223. At this time, the DC current (load current) flowing in the load 210 formed at the output unit constitutes a current loop of a route G shown. Thus, the load current is detected by the current detection unit 209 which constitutes a part of the route G.

The constant voltage/constant current bicontrol unit 223 is structured to be able to switch either one of constant voltage controlling and constant current controlling according to a control signal of the controller 220. Initially, the controller 220 sends the control signal to the constant voltage/constant current bicontrol unit 223 so as to perform the constant voltage controlling by using the current detection unit 209. Also, the constant voltage/constant current bicontrol unit 223 disconnects a connection between the unit 223 and the voltage detection unit 206, and controls the switching unit 202 such that a load current value becomes a predetermined value to perform constant-current driving of the high voltage generation circuit. At this constant-current driving, the controller 220 monitors an output voltage value by using the voltage detection unit 206.

Subsequently, constant voltage controlling is performed such that a voltage value detected by the voltage detection unit 206 is always outputted constantly. That is, the controller 220 sends the signal to the constant voltage/constant current bicontrol unit 223, connects the voltage detection unit 206 and the constant voltage/constant current bicontrol unit 223 to each other, and disconnects a connection between the current detection unit 209 and the constant voltage/ constant current bicontrol unit 223, so as to perform the constant voltage controlling by using the voltage detection unit 206. Then, the controller 220 performs the constant-voltage drive controlling on the constant voltage/constant current bicontrol unit 223 to obtain the value identical with the value outputted by the voltage detection unit 206 in the constant-current driving.

Therefore, a high voltage power supply of a constant current/constant voltage bicontrol system capable of flowing at constant voltage the current of a desired value to the load 210 of which state variously changes.

As described above, according to the present embodiment, there are provided the two rectifiers for the voltage outputted from the identical winding, and a current route in which the current flowing into the voltage detection unit 206 is made different from a current route in which the load current flows. Thus, the current detection unit 209 can detect only the load current with high accuracy. Further, since the rectifier for load applying and the rectifier for the voltage detecting are independently structured for the voltage generated from the identical winding and the voltage is detected by using only one of these rectifiers, the voltage detection unit 206 can detect the output voltage with high accuracy. Therefore, as compared with the conventional examples, the high voltage generation circuit of the constant current/constant voltage bicontrol system capable of supplying a high-accuracy and optimum load current value can be provided.

Furthermore, by applying such the high voltage generation circuit as structured above to the image formation apparatus, for example, it can derive an effect that a defective operation such as defective transferring or the like due to the variation of a transferring current can be prevented thereby causing each unit in the image formation apparatus to appropriately operate.

The present invention is by no means intended to be limited to the above-described embodiments and can involve all modifications with the range disclosed by the attached claims.

What is claimed is:

1. A high voltage generation circuit used in an image formation apparatus to which an electrophotographic system is applied, said circuit comprising:
    a step-up transformer;
    a switching circuit for driving said step-up transformer;
    a rectifier circuit for rectifying and smoothing a pulsating voltage outputted by said step-up transformer, to generate a DC output voltage;
    a voltage detection circuit for detecting the DC output voltage generated by said rectifier circuit; and
    a current detection circuit for detecting a current flowing in a load to which the DC output voltage is applied,
    wherein said voltage detection circuit is not directly connected to a ground potential but is connected to said current detection circuit.

2. A circuit according to claim 1, further comprising a first control circuit, connected between said voltage detection circuit and said switching circuit, for driving and controlling said switching circuit such that an output value of said voltage detection circuit becomes a predetermined voltage value.

3. A circuit according to claim 2, further comprising a second control circuit, connected between said current detection circuit and said first control circuit, for controlling said first control circuit such that an output value of said current detection circuit becomes a predetermined current value.

4. A circuit according to claim 3, wherein said first control circuit performs a predetermined calculation process by using the output value of said current detection circuit and the output value of said second control circuit as parameters, to generate one signal value.

5. A circuit according to claim 1, wherein said voltage detection circuit has a resistor for dividing the DC output voltage generated by said rectifier circuit.

6. A high voltage generation circuit comprising:
    a first transformer for outputting a positive-bias pulsating voltage;
    a first switching circuit for driving said first transformer;
    a first rectifier circuit for rectifying and smoothing the pulsating voltage outputted by said first transformer, to generate a DC output voltage;
    a second transformer for outputting a negative-bias pulsating voltage;
    a second rectifier circuit, connected to said first rectifier circuit, for rectifying and smoothing the pulsating voltage outputted by said second transformer, to generate the DC output voltage;
    a voltage detection circuit, connected to said first and second rectifier circuits in parallel, for detecting the DC output voltages generated by said first and second rectifier circuits; and
    a current detection circuit for detecting a current flowing in a load to which the DC output voltages generated by said first and second rectifier circuits are applied,
    wherein said voltage detection circuit is not directly connected to a ground potential but is connected to said current detection circuit.

7. A circuit according to claim 6, wherein said voltage detection circuit has a resistor for dividing the DC output voltages generated by said first and second rectifier circuits.

8. A circuit according to claim 6, further comprising a first control circuit, connected between said voltage detection circuit and said first switching circuit, for driving and controlling said first switching circuit such that an output value of said voltage detection circuit becomes a predetermined voltage value.

9. A circuit according to claim 8, further comprising a second control circuit, connected between said current detection circuit and said first control circuit, for controlling said first control circuit such that an output value of said current detection circuit becomes a predetermined current value.

10. A circuit according to claim 9, wherein said first control circuit performs a predetermined calculation process by using the output value of said current detection circuit and an output value of said second control circuit as parameters, to generate one signal value.

11. A high-voltage generation circuit comprising:
    a step-up transformer;
    a switching circuit for driving said step-up transformer;
    first and second rectifier circuits for rectifying and smoothing a pulsating voltage outputted by said step-up transformer, to generate DC output voltages, said first and second rectifier circuits being connected in parallel to an identical winding of said step-up transformer;
    a voltage detection circuit for detecting the DC output voltage generated by said first rectifier circuit;
    a current detection circuit for detecting a current flowing in a load to which the DC output voltage generated by said second rectifier circuit is applied;
    a first control circuit for controlling driving of said switching circuit such that an output of said voltage detection circuit becomes a predetermined value; and
    a second control circuit for controlling said first control circuit such that an output of said current detection circuit becomes a predetermined value.

12. A high voltage generation circuit comprising:
    a step-up transformer;
    a switching circuit for driving said step-up transformer;
    first and second rectifier circuits for rectifying and smoothing the pulsating voltage outputted by said step-up transformer, to generate the DC output voltages, said first and second rectifier circuits being connected in parallel to the identical winding of said step-up transformer;
    a voltage detection circuit for detecting the DC output voltage generated by said first rectifier circuit;
    a current detection circuit for detecting the current flowing in the load to which the DC output voltage generated by said second rectifier circuit is applied;
    a first control circuit; and a second control circuit, wherein in a first mode said first control means controls the driving of said switching circuit such that the output of said current detection circuit becomes the predetermined value, and in a second mode said second control means controls said first control circuit such that the output of said voltage detection circuit becomes the output of said voltage detection circuit at a time when said first control circuit performs the controlling in the first mode.

13. A circuit according to claim 12, wherein in the first mode said second control circuit disconnects a connection between said voltage detection circuit and said first control circuit, and connects said current detection circuit and said first control circuit to each other, and in the second mode said second control circuit connects said voltage detection circuit and said first control circuit to each other, and disconnects a connection between said current detection circuit and said first control circuit.

* * * * *

UNITED STATES PATENT AND TRADEMARK OFFICE
CERTIFICATE OF CORRECTION

PATENT NO. : 5,953,218

DATED : September 14, 1999

INVENTOR : TAKUYA MUKAIBARA

It is certified that error appears in the above-identified patent and that said Letters Patent is hereby corrected as shown below:

COLUMN 4:

Line 59, "thousands" should read --thousand--.
Line 61, "tens" should read --tens of--.

COLUMN 5:

Line 1, "accurately" should read --accurate--.
Line 34, "An another" should read --Another--.
Line 39, "A still" should read --Still--.

COLUMN 10:

Line 15, "lowvoltage" should read --low-voltage--.

UNITED STATES PATENT AND TRADEMARK OFFICE
CERTIFICATE OF CORRECTION

PATENT NO.  : 5,953,218

DATED       : September 14, 1999

INVENTOR    : TAKUYA MUKAIBARA

It is certified that error appears in the above-identified patent and that said Letters Patent is hereby corrected as shown below:

<u>COLUMN 11</u>:

Line 48, "both the" should read --both--.
Line 66, "following" should read --the following--.

Signed and Sealed this

Fourth Day of July, 2000

Attest:

Q. TODD DICKINSON

Attesting Officer        Director of Patents and Trademarks